United States Patent
Milacic et al.

(10) Patent No.: US 9,088,017 B2
(45) Date of Patent: Jul. 21, 2015

(54) GAS RECLAIMING SYSTEM AND METHOD

(71) Applicant: Ford Motor Company, Dearborn, MI (US)

(72) Inventors: Milos Milacic, New Boston, MI (US); William Schank, Howell, MI (US); Kurt Osborne, Dearborn, MI (US)

(73) Assignee: FORD MOTOR COMPANY, Dearborn, MI (US)

( * ) Notice: Subject to any disclaimer, the term of this patent is extended or adjusted under 35 U.S.C. 154(b) by 4 days.

(21) Appl. No.: 14/229,869

(22) Filed: Mar. 29, 2014

(65) Prior Publication Data

US 2014/0212774 A1    Jul. 31, 2014

Related U.S. Application Data

(62) Division of application No. 11/433,394, filed on May 11, 2006, now Pat. No. 8,715,870.

(51) Int. Cl.
    *H01M 2/40*      (2006.01)
    *H01M 8/04*      (2006.01)
    *H01M 8/06*      (2006.01)
    *B01D 53/04*     (2006.01)

(52) U.S. Cl.
    CPC ........ *H01M 8/04097* (2013.01); *H01M 8/0662* (2013.01); *B01D 53/04* (2013.01); *B01D 2258/0208* (2013.01); *B01D 2259/4525* (2013.01); *H01M 8/04753* (2013.01); *Y02E 60/50* (2013.01); *Y02E 60/528* (2013.01)

(58) Field of Classification Search
    CPC . Y02E 60/50; Y02E 60/528; H01M 8/04753; H01M 8/04097; H01M 8/04089; H01M 8/04231; H01M 8/04233; H01M 8/04955; H01M 8/04179
    USPC .......................................................... 429/411
    See application file for complete search history.

(56) References Cited

U.S. PATENT DOCUMENTS

2010/0239924 A1*  9/2010  McElroy et al. .............. 429/423

* cited by examiner

*Primary Examiner* — Cynthia H Kelly
*Assistant Examiner* — Monique Wills
(74) *Attorney, Agent, or Firm* — Damian Porcari; Tung & Associates

(57) ABSTRACT

A gas reclaiming system is disclosed. The gas reclaiming system includes a getter device adapted to receive mixed gases and separate the mixed gases into at least one gas of interest and constituent gases. A recirculation loop is disposed in fluid communication with the getter device and adapted to receive the at least one gas of interest from the getter device. A gas reclaiming method is also disclosed.

18 Claims, 4 Drawing Sheets

GAS RECLAIMING SYSTEM AND METHOD

This is a Divisional of a co-pending application Ser. No. 11/433,394, filed on May 11, 2006.

FIELD

The present invention relates to gas reclaiming systems. More particularly, the present invention relates to a gas reclaiming system and method which is suitable for reclaiming hydrogen or other gas purged or lost from a fuel cell or other system.

BACKGROUND

A hydrogen fuel cell system typically includes a fuel cell stack including multiple, stacked fuel cells. Each fuel cell has a polymer electrolyte membrane (PEM) sandwiched between a cathode and an anode. The fuel cell stack is contained within a fuel cell enclosure. During operation of a hydrogen fuel cell system, some nitrogen from air in the oxidant gas of the cathode crosses over from the cathode side to the anode side of each fuel cell stack due to a gradient in nitrogen concentration. This nitrogen crossover leads to lower hydrogen fuel concentration in the anode side of the fuel cell stack, compromising fuel cell performance.

In order to remove nitrogen from a fuel cell stack, the stack is periodically purged. However, when purging nitrogen from the fuel cell stack, some hydrogen is released from the stack with the nitrogen. Furthermore, when the anode of the fuel cell stack is pressurized, some hydrogen escapes from the fuel cell stack through seals between the cells. This hydrogen is typically vented from the fuel cell stack enclosure. Therefore, fuel hydrogen is lost through several different aspects of fuel cell operation.

Accordingly, a system and method are needed which are capable of reclaiming hydrogen lost from a fuel cell system during fuel cell operation.

SUMMARY

The present invention is generally directed to a gaseous fuel reclaiming system. The gaseous fuel reclaiming system includes a getter system adapted to receive mixed gases and separate the mixed gases into at least one gas of interest and constituent gases. A recirculation loop is disposed in fluid communication with the getter device and adapted to receive at least the gas of interest from the getter device.

The present invention is further directed to a gaseous hydrogen reclaiming method. The gas reclaiming method includes providing a system, collecting mixed gases from the system, separating the mixed gases into at least one gas of interest (hydrogen) and constituent gases and returning the at least one gas of interest (hydrogen) to the system.

BRIEF DESCRIPTION OF THE DRAWINGS

The invention will now be described, by way of example, with reference to the accompanying drawings, in which.

DETAILED DESCRIPTION

Figure 1:
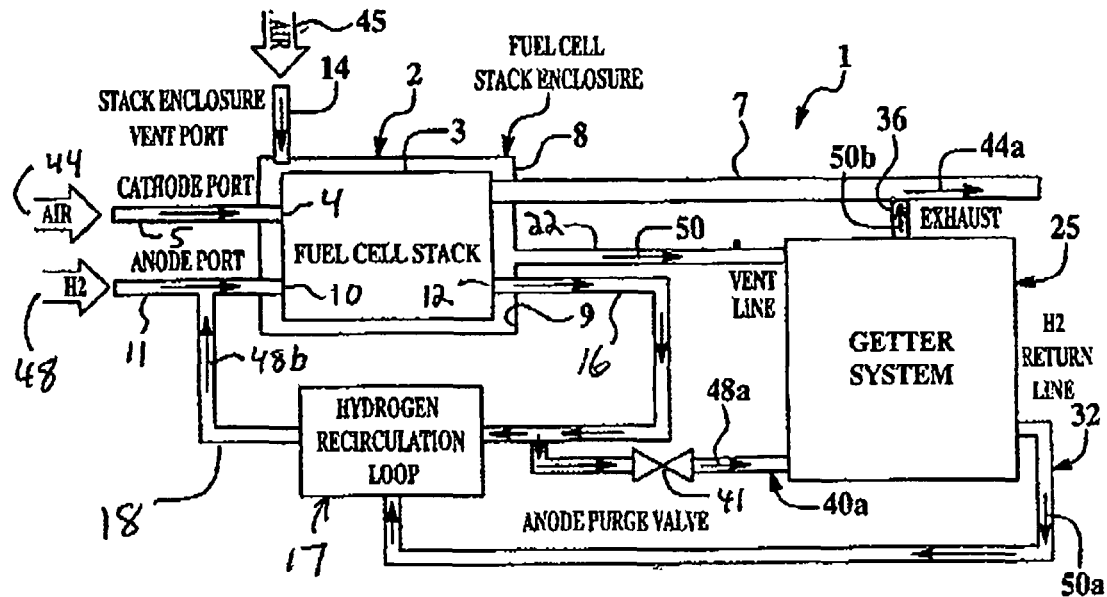
FIG. 1 is a schematic diagram of an illustrative embodiment of a gas reclaiming system according to the present invention.

Referring initially to FIG. 1 of the drawings, an illustrative embodiment of a gas reclaiming system according to the present invention is generally indicated by reference numeral 1. The gas reclaiming system 1 is suitable for reclaiming a fuel gas such as hydrogen purged or otherwise lost from a fuel cell stack 2 and returning the fuel gas to the fuel cell stack 2. However, it will be appreciated by those skilled in the art that the gas reclaiming system 1 is equally suitable for reclaiming hydrogen or other absorbable gas of interest lost from any type of system and typically returning the gas to the system.

The fuel cell stack 2 typically includes multiple, stacked fuel cells collectively denoted as 3. Each hydrogen fuel cell includes a polymer electrolyte membrane (PEM) which is sandwiched or interposed between a cathode catalyst layer and an anode catalyst layer. The stack of fuel cells 3 is typically contained in a fuel cell stack enclosure 8 having an enclosure interior 9. The fuel cell stack 3 has a cathode inlet 4 which is disposed in fluid communication with a cathode port 5. The cathode port 5 is disposed in fluid communication with a source (not shown) of an oxidant gas 44, typically air containing oxygen. A cathode outlet 6 of the fuel cell stack 3 is typically disposed in fluid communication with a cathode exhaust conduit 7 which is adapted to distribute exhaust oxidant gas or air 44a, in addition to by-product water, from the fuel cell stack 2.

The fuel cell stack 3 further has an anode inlet 10 which is disposed in fluid communication with an anode port 11. The anode port 11 is disposed in fluid communication with a source (not shown) of a fuel gas 48, typically hydrogen. An anode outlet 12 of the fuel cell stack 2 is typically disposed in fluid communication with an anode outlet conduit 16 which is adapted to distribute un-used fuel gas 48a from the fuel cell stack 2. An air inlet conduit 14 may be disposed in fluid communication with the enclosure interior 9 of the enclosure 8 to distribute air 45 into the enclosure interior 9. The air 45 facilitates the purging of gases from the enclosure interior 9, as will be hereinafter further described. The hydrogen reclaiming system 1 includes an enclosure outlet conduit 22 which is disposed in fluid communication with the enclosure interior 9 of the fuel cell enclosure 8. The enclosure outlet conduit 22 is adapted to conduct mixed gases 50, which includes leaked fuel gas (typically hydrogen), from the fuel cells 3 to the enclosure interior 9 of the fuel cell enclosure 8. A getter device 25, which will be hereinafter described, is connected to the enclosure outlet conduit 22.

A hydrogen recirculation loop 17 is disposed in fluid communication with a getter outlet conduit 32 which extends from the getter device 25. The hydrogen recirculation loop 17 may also be disposed in fluid communication with the anode outlet conduit 16 of the fuel cell stack 2. In that case, the hydrogen recirculation loop 17 is adapted to receive the un-used fuel gas 48a from the anode outlet conduit 16 and reclaimed fuel gas 50a from the getter outlet conduit 32. A fuel gas return conduit 18 connects the hydrogen recirculation loop 17 to the anode port 11 of the fuel cell system 2. The fuel gas return conduit 18 is adapted to distribute fuel gas 48b, which typically includes both the un-used fuel gas 48a from the anode outlet conduit 16 and the reclaimed fuel gas 50a from the getter outlet conduit 32, to the anode port 11. A connecting conduit 40a, which may. be fitted with a connecting conduit valve 41, may connect the anode outlet conduit 16 to a getter chamber 26 of the getter device 25.

An exhaust return conduit 36 typically extends from the getter system 25 and may connect the getter system 25 to the cathode exhaust conduit 7. The exhaust return conduit 36 is adapted to distribute the constituent gases 50b, which were separated out from the reclaimed fuel gas 50a in the mixed gases 50 by the getter system 25, to the cathode exhaust conduit 7.

A valve 23 may be provided in the enclosure outlet conduit 22 to regulate flow of the mixed gases 50 through the enclosure outlet conduit 22. The getter system 25 is disposed in fluid communication with the enclosure outlet conduit 22. The getter device 25 typically includes a getter chamber 26 connected to the enclosure outlet conduit 22. A reversible gas getter 28 is provided in the getter chamber 26. The gas getter 28 is typically a reversible hydrogen getter which is adapted to separate mixed gases 50 by chemically capturing or reclaiming the typically hydrogen fuel gas 50a from the remaining constituent gases 50b, which typically includes water vapor, nitrogen and trace gases. A getter heater 29 is provided in thermal contact with the gas getter 28 to heat the gas getter 28. The getter outlet conduit 32, which may be fitted with a getter valve 33, is disposed in fluid communication with the getter 28. The getter outlet conduit 32 is adapted to conduct the reclaimed fuel gas 50a from the getter 28. A valve 37 may be provided in the exhaust return conduit 36 to regulate the flow of the constituent gases 50b through the exhaust return conduit 36.

During operation of the fuel cell, a stream of the fuel gas 48, typically hydrogen, is distributed through the anode port 11 and anode inlet 10, respectively, into the fuel cell stack 3. Simultaneously, a stream of the oxidant gas 44, typically oxygen-containing air, is distributed through the cathode port 5 and cathode inlet 4, respectively, into the fuel cell stack 3. At the anode of the fuel cell stack 3, the typically hydrogen 44 is split into electrons and protons. The electrons are distributed through an external circuit (not shown) and typically through an electric motor (not shown) to drive the motor. The protons are passed through the PEM to the cathode of each fuel cell. After they are distributed through the external circuit and motor, the electrons are distributed to the cathode. At the cathode, the electrons returning from the external circuit are combined with protons from the PEM to form water. The vaporized water with the remaining oxidant gas/air 44a is disposed from the fuel cell stack 3 through the cathode outlet 6 and cathode exhaust conduit 7, respectively.

Some of the fuel gas 48 which flows into the fuel cell stack 3 through the anode port 11 and anode inlet 10 is unused (not split into hydrogen and protons). The resulting un-used fuel gas 48a is distributed from the fuel cell stack 3 through the anode outlet 12 and from the fuel cell system 2 to the hydrogen recirculation loop 17 through the anode outlet conduit 16. A portion of the un-used fuel gas 48a may be distributed from the anode outlet conduit 16 and into the getter system 25 through the connecting conduit 40 by opening of the connecting purge valve 41, when purging is necessary.

Throughout operation of the fuel cell system, nitrogen from the typically air 44 frequently accumulates in the cathode side of the fuel cell stack 3. Some of this nitrogen crosses over from the cathode side to the anode side of the fuel cell stack 3 by diffusion through the cell membrane. The mixed gases 50, which typically include the nitrogen and un-used fuel gas as well as water vapor and trace gases, accumulate at the anode outlet 12 of the fuel cell stack 3. Consequently, when the concentration of nitrogen reaches a certain threshold value, the mixed gases 50 are periodically purged from the fuel cell stack 3. Therefore, a purge valve 41 is periodically opened to facilitate purging of the mixed gases 50 from the fuel cell stack 3 and typically into the getter system 25. Additionally hydrogen typically also dissipates through seals (not shown) in the fuel cells of the fuel cell stack 3 and accumulates in the fuel cell stack enclosure 9. Introducing pressurized air 45 into the enclosure interior 9 through the air inlet conduit 14 to avoid hydrogen buildup is common approach to venting the hydrogen from fuel cell stack. The mixed gases 50 are distributed from the enclosure interior 9 of the fuel cell enclosure 8, through the enclosure outlet conduit 22 and into the getter system 25 of the hydrogen reclaiming system 1, respectively.

When necessary to augment the supply of fuel gas 48 at the anode inlet 10 of the fuel cell stack 3, the unused fuel gas in the mixed gases 50 is separated or reclaimed as reclaimed fuel gas 50a from the constituent gases 50b, which includes the nitrogen, water vapor and trace gases, and returned to the anode port 11 by hydrogen recirculation loop 17.

In the hydrogen recirculation loop 17, the reclaimed fuel gas 50a is combined with the un-used fuel gas 48a from the anode outlet conduit 16. The resulting fuel gas 48b is distributed from the hydrogen recirculation loop 17 to the anode port 11 of the fuel cell system 2 through the fuel gas return conduit 18.

Accordingly, upon subsequent start-up of the fuel cell system 2 after shut-down, sufficient quantities of fuel gas 48 are present at the anode inlet 10 to facilitate optimum start-up and operation of the fuel cell system 2. The getter device 25 and the purge mechanism of the fuel cell system 2 can be operated in conjunction with each other by electronic control modules with appropriate software algorithms.

Figure 2:
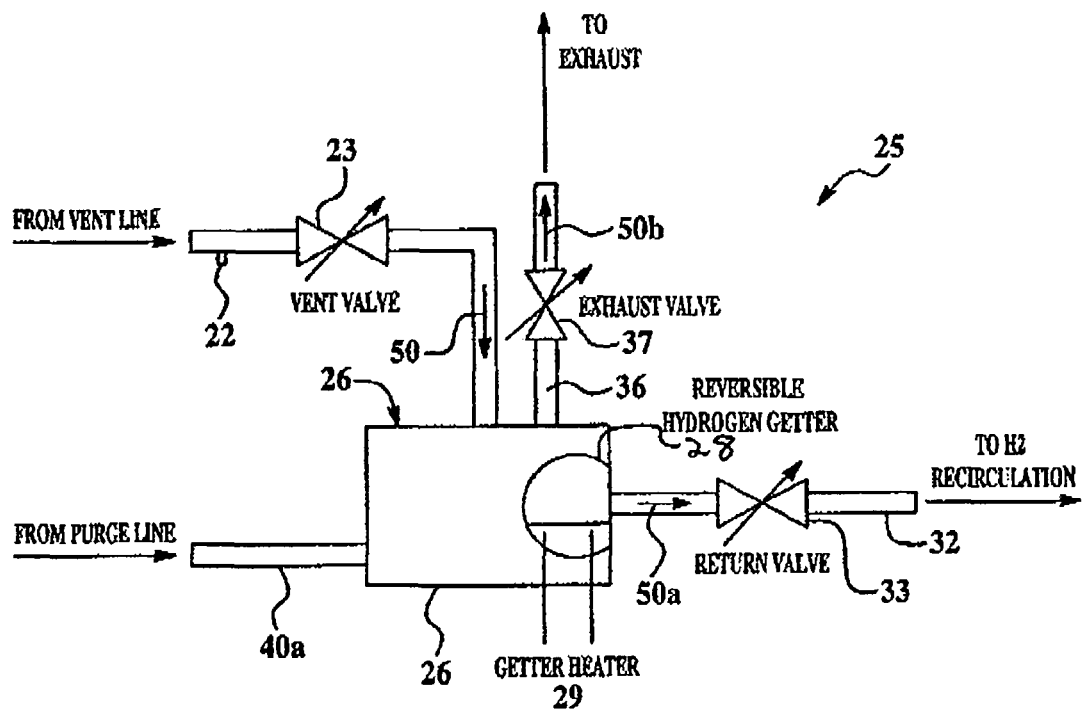
FIG. 2 is a schematic diagram of one potential realization of a hydrogen getter system of the gas reclaiming system.

Referring next to FIG. 2 of the drawings, a first getter system 25 is described. A mixture 50 (FIG. 1) of air and hydrogen that previously leaked through seals of the fuel cell stack 3 into the enclosure interior 9 is carried by conduit 22 into the getter chamber 26, typically through valve 23. Also, purged gases 48a, are introduced to the getter chamber 26 of the getter system 25 through conduit 40a.The getter system 25 typically includes a getter chamber 26, the reversible gas getter 28, and reversible getter heater 29 disposed in thermal contact with the reversible gas getter 28. The hydrogen getter system 25 separates mixed gases in 50 and 48a by chemically separating and capturing the hydrogen fuel gas 50a from the remaining constituent gases 50b, which typically includes water vapor, nitrogen and trace gases. The getter heater 29 is provided in thermal contact with the gas getter 28 to heat the gas getter 28. The getter outlet conduit 32, which may be fitted with a getter valve 33, is disposed in fluid communication with the getter valve 28. The getter outlet conduit 32 is adapted to conduct the reclaimed fuel gas 50a from the getter valve 28. A valve 37 may be provided in the exhaust return conduit 36 to regulate the flow of the constituent gases 50b through the exhaust return conduit 36.

During a hydrogen release phase, vent valve 23 and exhaust valve 37 of the getter system 50 are closed (and purge valve 41 of the fuel cell system should be closed); the gas getter 28 is heated by the getter heater 29. As the fuel gas in the mixed gases 50 is chemically captured by the gas getter 28, the mixed gases 50 are separated into the reclaimed fuel gas 50a and the constituent gases 50b.The getter valve 33 is opened to facilitate distribution of the reclaimed fuel gas 50a from the getter chamber 26, through the getter outlet conduit 32 and into the hydrogen recirculation loop 17, respectively.

During a hydrogen capture phase, exhaust valve 37 and vent valve 23 are open, and return valve 33 is closed, allowing the constituent gases 50b to be routed from the getter chamber 26, through the exhaust return conduit 36 and drawn into the cathode exhaust conduit 7 with the exhaust gas 44a flowing through the cathode exhaust conduit 7. The constituent gases 50b are discharged from the cathode exhaust conduit 7 along with the exhaust gas 44a.

Figure 3:
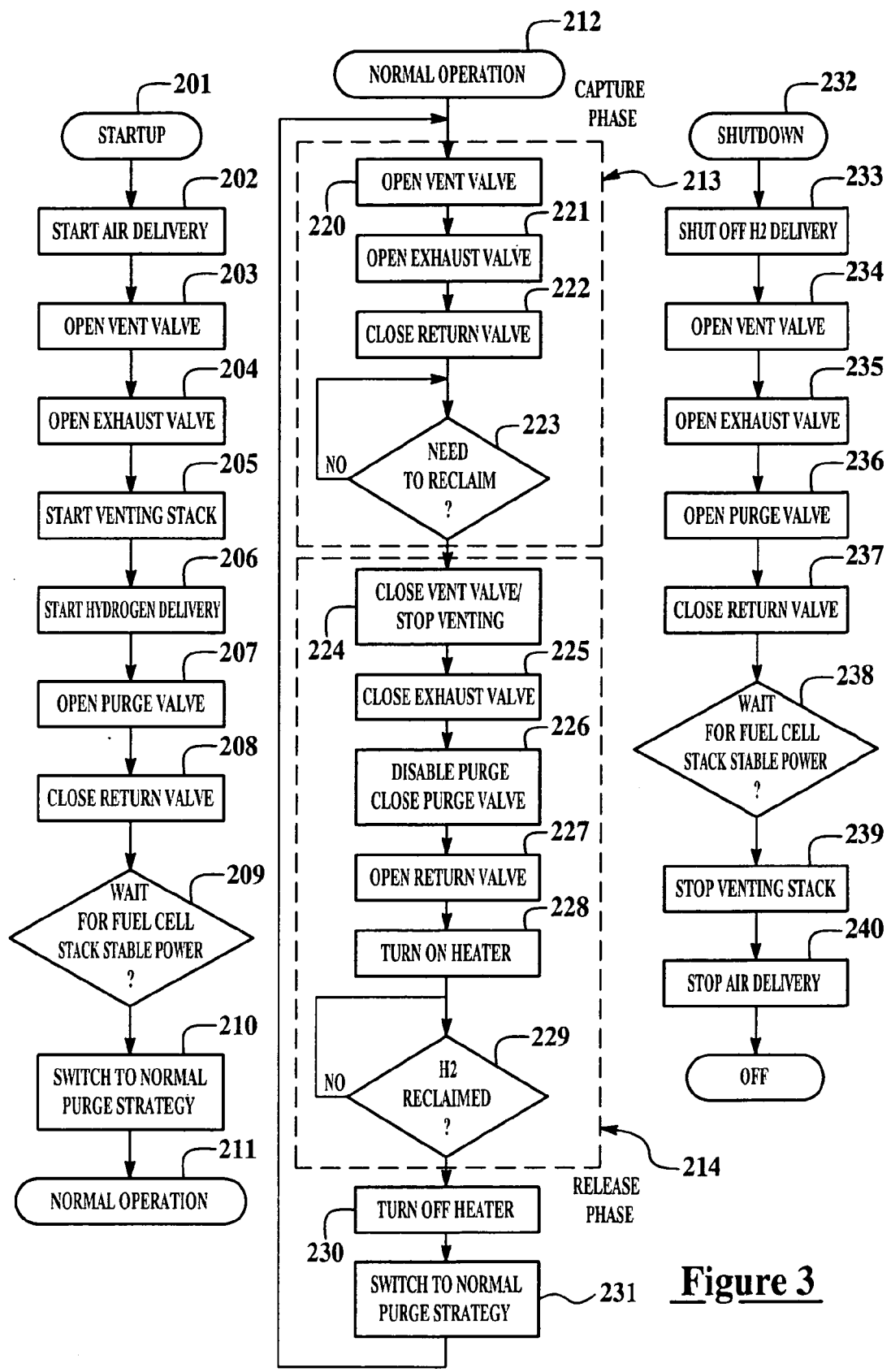
FIG. 3 is flow diagram illustrating steps carried out utilizing the realization in FIG. 2, according to a gas reclaiming method according to the present invention.

Referring next to FIG. 3 of the drawings, a flow diagram 200 illustrating steps carried out according to an illustrative embodiment of a gas reclaiming method from FIG. 2 according to the present invention is shown. In start-up step 201, air delivery into the fuel cell stack 3 is started in step 202, followed by opening vent valve 23 in step 203. In step 204, exhaust valve 37 is opened and in step 205 stack venting is started by moving air 45 through fuel cell vent intake 14. In step 206, hydrogen fuel 48 is introduced into the fuel cell stack 2. By opening purge valve 41 in step 207, air that was in the stack (and being displaced by hydrogen coming through conduit 11) is flowing into the getter system 25, further into the getter chamber 26 through connecting conduit 40a. In step 208, the return valve 33 is closed to prevent the (mostly air) gas flow into the hydrogen recirculation loop 17. After stable fuel cell stack operation is reached in step 209, the normal or conventional purge strategy is resumed in step 210, and fuel cell operation is considered to be in normal operational phase in step 211. Stable fuel cell operation can be defined in numerous ways (eg. Individual cell voltages).

During normal operation 212, in capture phase 213, vent valve 23 and exhaust valve 37 are open in steps 220 and 221, respectively, while return valve 33 is closed. If it is determined that there is need to reclaim hydrogen (using a time based method, empirically or by measurements in the fuel cell system) in step 223, the reclaim phase 214 is started. In this reclaim phase, vent valve 23 is closed and air 45 delivery into the enclosure is stopped in step 224. In steps 225 to 228, exhaust valve 37 is closed, purge valve 41 is closed to disable purge strategy, return valve 33 is opened and getter heater 29 is activated, respectively. When it is determined (empirically, or by using a time table or sensor input, etc.) that all hydrogen is reclaimed in step 229, getter heater 29 is turned off in step 230 and purge strategy is resumed in step 231, and new capture phase is started by executing step 220.

During the shutdown phase 232, hydrogen fuel supply is turned off in step 233. Vent valve 23, exhaust valve 37 and purge valve 41 are opened in steps 234-236, respectively, in order to route the air and remaining hydrogen past the gas getter 28 so that hydrogen is absorbed. In step 237, return valve 33 is closed to prevent any gases from being fed to hydrogen recirculation loop 17. After depletion of the fuel from the fuel cell stack (typically determined by cell voltages or by other monitoring method), venting of the stack 3 is stopped in step 238 and air supply is ceased in step 239.

Figure 4:
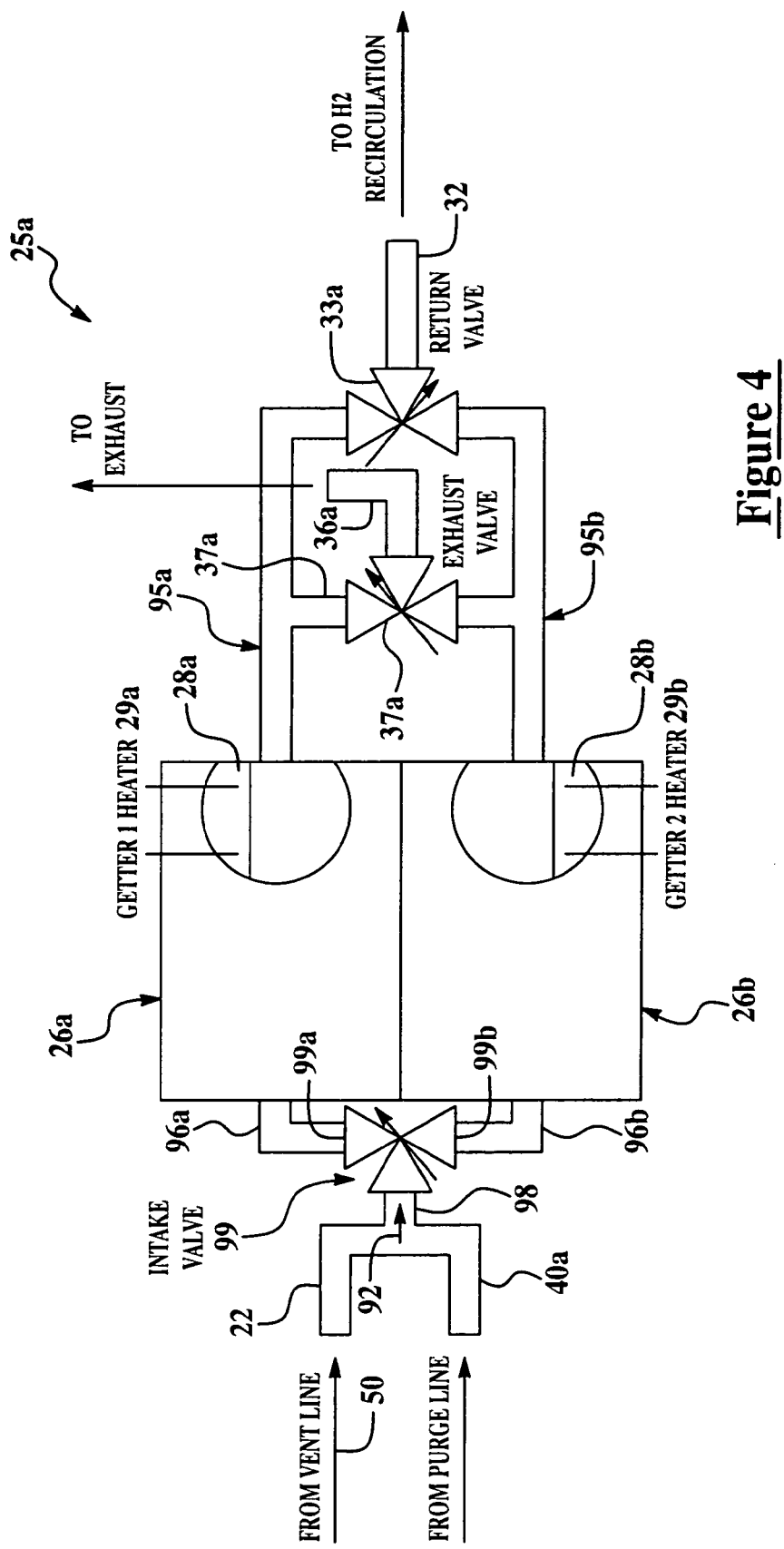
FIG. 4 is a schematic diagram of another and preferred potential realization of a hydrogen getter system of the gas reclaiming system.

Referring next to FIG. 4 of the drawings, a second or alternative getter system 25a which is suitable for implementation of the gas reclaiming system 1 is described. A mixture 50 of air and hydrogen that previously leaked through seals of the fuel cell stack 3 is carried by conduit 22 along with gas purged from the fuel cell stack 3, which is carried by conduit 40a. The mixture 50 is mixed in conduit 98. Gas mixture from conduit 98 is fed by intake valve 99, the position of which determines if gas is routed to chamber 26a or 26b. Position of valves 99, 37a and 33a determine the exact flow of gasses through getter system 25a, guaranteeing that when one side of the getter system 25a is in hydrogen-absorbing phase, the other side of the getter system 25a is in hydrogen-release phase. When valves 99, 37a and 33a are in position A, gas mixture 91 is passed by valve 99 in position 99a, through conduit 96a to the getter chamber 26a. A reversible gas getter 28a provided in chamber 26a separates mixed gases 91 by chemically capturing the hydrogen fuel gas from the remaining constituent gases in the mixed gases 91. The chemically-captured hydrogen fuel gas and constituent gases are passed to conduit 95a. Valves 37a and 33a in position A ensure that constituent gases are passed into exhaust conduit 36a and further on to the system exhaust 7. At the same time, a getter heater 29b which is in thermal contact with the gas getter 28b heats the gas getter 28b. By heating gas getter 28b, previously absorbed hydrogen is released into a getter outlet conduit 95b, which by valves 37a and 33a (in position A) discharges released hydrogen into the conduit 32 to be returned by hydrogen recirculation 17 into the fuel cell stack 3 by anode stack inlet 10. Once all captured hydrogen is released or in pre-determined timing fashion, the valves 99, 37a and 33a are reverted to their other position (B) and getter chambers 26a and 26b reverse roles.

Figure 5:
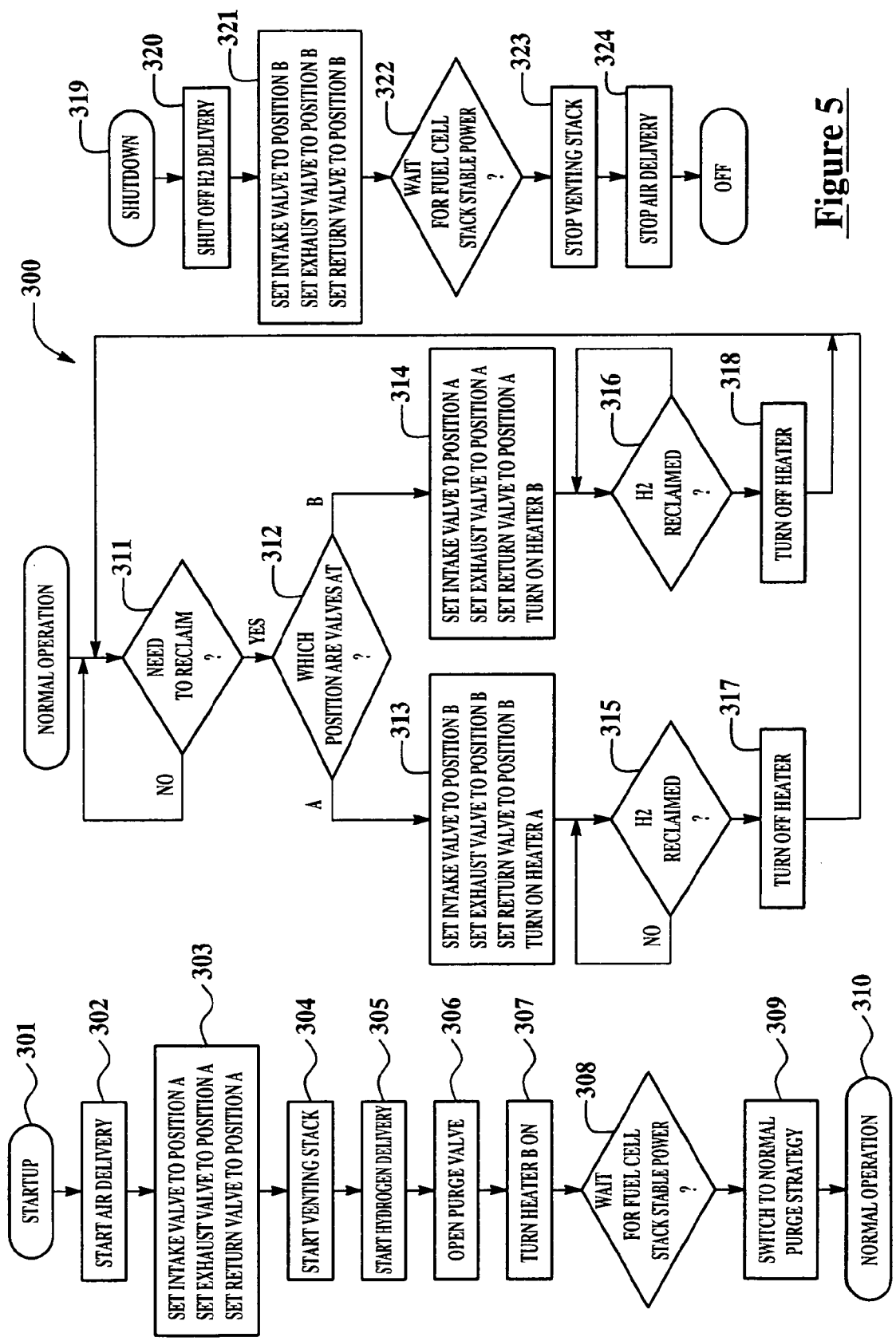
FIG. 5 is a flow diagram illustrating steps carried out utilizing the realization in FIG. 4, according to a gas reclaiming method according to the present invention.

Referring next to FIG. 5 of the drawings, a flow diagram 300 illustrating steps carried out according to an illustrative embodiment of a gas reclaiming method from FIG. 4 according to the present invention is shown. In start-up step 301, air delivery into the fuel cell stack 3 is started in the step 302, followed by setting of intake valve 99, exhaust valve 37a and return valve 33a to position A in step 303. In step 304, stack venting is started by moving air 45 through fuel cell vent intake 14. In step 305, hydrogen fuel 48 is introduced into the fuel cell stack 2. By opening of purge valve 41 in step 306, air that was in the stack (and being displaced by hydrogen coming through conduit 11) flows into the getter system 25a, further into the getter chamber 26a. In step 307, heater 29b in the getter chamber 26b is turned on to release hydrogen, which was captured during the previous shutdown, through conduit 95b and return valve 33a and into hydrogen recirculation loop 17, respectively. After stable fuel cell stack operation is reached in step 308, the normal or conventional purge strategy is resumed, and fuel cell operation is considered to be in normal operation phase. Stable fuel cell operation can be defined in numerous ways (e.g. using Individual cell voltages, for example).

During normal operation, in step 311 it is determined if there is need to reclaim hydrogen (using a time-based method, empirically or by measurements in the fuel cell system, for example). If there is a need to reclaim hydrogen, in step 312 it is determined in which positions are the intake valve 99, exhaust valve 37a and return valve 33a. If the above mentioned valves are in position A, then intake valve 99, exhaust valve 37a and return valve 33a are set to position B in step 313 and heater 29a is turned on; subsequently, in step 315 all hydrogen is waited to be reclaimed in order to shut off heater 29a in step 317.

If in the step 312 the intake valve 99, exhaust valve 37a and return valve 33a are in position B, then intake valve 99, exhaust valve 37a and return valve 33a are set to position A in step 314 and heater 29b is turned on; subsequently step 316 waits for all hydrogen to be reclaimed in order to shut off heater 29b in step 318. The cycle continues with step 311. During the shutdown phase 320, hydrogen fuel supply is turned off in step 321. Intake valve 99, exhaust valve 37a and return valve 33a are set to position B in step 322, allowing all gases from the stack to pass through enclosure 26b with hydrogen being absorbed by reversible getter 28b in order to be reclaimed in the subsequent start-up step 301. After depletion of the fuel from the fuel cell stack in step 323 (determined by cell voltages, or by other monitoring method), venting of the stack 3 is stopped in step 324 and air supply is ceased in step 325.

While the preferred embodiments of the invention have been described above, it will be recognized and understood that various modifications can be made in the invention and the appended claims are intended to cover all such modifications which may fall within the spirit and scope of the invention.

What is claimed is:

1. A gas reclaiming method, comprising:
   providing a system;
   providing at least one reversible gas getter device;
      collecting mixed gases from said system and providing a feed of said mixed gasses to said gas getter device;
   separating said mixed gases into at least one unused fuel gas of interest and constituent gases by selectively chemically absorbing said at least one fuel gas of interest by said gas getter device while said at least one gas getter device exhausts said constituent gases; and
   returning said at least one unused fuel gas of interest to said system, said returning comprising heating said getter device to produce said at least one unused fuel gas of interest.

2. The method of claim 1 wherein said system comprises a fuel cell system and said at least one fuel gas of interest comprises hydrogen.

3. The method of claim 2 further comprising said heating while placing said at least one getter device in fluid communication with a recirculating loop, said recirculating loop fluidly connecting an outlet of said fuel cell system with an inlet of said fuel cell system, said heating while shutting off said feed of mixed gases to said at least one getter device.

4. The method of claim 2 further comprising discarding said constituent gases.

5. The method of claim 4 wherein said discarding said constituent gases comprises discharging said constituent gases through a cathode exhaust conduit comprising said fuel cell system.

6. A gas reclaiming method, comprising:
   providing a fuel cell stack;
   providing at least one reversible gas getter device;
   providing a feed of mixed gases from said fuel cell stack to said at least one reversible gas getter device;
   separating said mixed gases in said at least one gas getter device into at least one fuel gas of interest and constituent gases by selectively chemically absorbing said at least one fuel gas of interest and exhausting said constituent gases;
   providing a recirculation loop disposed in fluid communication with an inlet and outlet of said fuel cell stack; and,
   selectively placing said at least one gas getter device in fluid communication with said recirculation loop while heating said at least one gas getter device to provide said at least one unused fuel gas of interest to said fuel cell stack through said recirculation loop.

7. The gas reclaiming method of claim 6 further comprising providing an exhaust conduit in fluid communication with said at least one gas getter device.

8. The gas reclaiming method of claim 7 further comprising removing fluid communication between said at least one gas getter device and said recirculation loop while said at least one gas getter device is chemically absorbing said unused fuel gas of interest.

9. The gas reclaiming method of claim 8 further comprising providing fluid communication between said at least one gas getter device and said exhaust conduit while said at least one gas getter device is chemically absorbing said unused fuel gas of interest.

10. The gas reclaiming method of claim 6 further comprising shutting off said feed of mixed gases from said fuel cell stack while heating said at least one gas getter device.

11. The gas reclaiming method of claim 7 further comprising removing fluid communication between said at least one gas getter device said exhaust conduit while heating said at least one gas getter device.

12. The gas reclaiming method of claim 6 wherein said unused fuel gas of interest comprises hydrogen.

13. The gas reclaiming method of claim 6, further comprising providing a fuel cell stack enclosure enclosing said fuel cell stack.

14. The gas reclaiming method of claim 6, further comprising selectively providing a feed of said mixed gases from at least one of said fuel cell stack and said fuel stack enclosure to said at least one gas getter device.

15. The gas reclaiming method of claim 6, wherein said at least one gas getter device comprises two gas getter devices.

16. The gas reclaiming method of claim 15, further comprising alternately configuring each of said gas getter devices to be in fluid communication with said feed of missed gases from said fuel cell stack on an inlet side of a respective one of said gas getter devices to receive said mixed gases from said fuel cell stack.

17. The gas reclaiming method of claim 16, further comprising alternately configuring each of said gas getter devices to be in fluid communication with said recirculation loop on an outlet side of a respective one of said gas getter devices to provide said at least one unused fuel gas of interest to said fuel cell stack.

18. A gas reclaiming method, comprising:
   providing a fuel cell stack;
   providing a fuel cell stack enclosure;
   providing at least one reversible gas getter device;
   selectively providing a feed of mixed gases from at least one of said fuel cell stack and said fuel stack enclosure to said at least one gas getter device;
   separating said mixed gases in said at least one gas getter device into at least one fuel gas of interest and constituent gases by selectively chemically absorbing said at least one fuel gas of interest;
   exhausting constituent gases from said at least one gas getter device;
   providing a recirculation loop disposed in fluid communication with said fuel cell stack and said at least one getter device; and,
   selectively placing said at least one getter device in fluid communication with said recirculation loop while heating said at least one gas getter device to provide said at least one unused fuel gas of interest to said fuel cell stack through said recirculation loop, said feed of mixed gases to said at least one gas getter device shut off during said heating.

* * * * *